United States Patent

[11] 3,596,105

[72] Inventor Joseph D. Segrest
  Cherry Hill, N.J.
[21] Appl. No. 860,286
[22] Filed Sept. 23, 1969
[45] Patented July 27, 1971
[73] Assignee The United States of America as
  represented by the Secretary of the Navy

[54] CONFIGURATION FOR OPTIMUMIZATION OF STARTER-GENERATOR DESIGN
  10 Claims, 3 Drawing Figs.
[52] U.S. Cl. ............................................. 290/46,
  318/252, 318/526, 290/31
[51] Int. Cl. .................................................. H02k 23/52
[50] Field of Search ............................................. 290/37, 38,
  10, 19, 22, 31, 46; 318/87, 252, 497, 526, 527,
  532, 506, 426, 427

[56] References Cited
  UNITED STATES PATENTS
  707,230  8/1902  Henry ........................... 290/19

| | | | |
|---|---|---|---|
| 2,806,962 | 9/1957 | Quantz | 290/31 |
| 2,926,295 | 2/1960 | Allen | 318/506 |
| 3,221,173 | 11/1965 | Hoover | 290/46 X |
| 3,398,344 | 8/1968 | McCormick | 318/426 X |

Primary Examiner—G. R. Simmons
Attorneys—R. S. Sciascia and Henry Hansen

ABSTRACT: A self-excited compound type DC starter-generator with automatic switching from long shunt excitation to short shunt excitation when the starter-generator changes its operation from that of a motor to that of a generator. A shunt field winding is connected by a pair of diodes to two different junctions on a serially connected armature winding and series field winding. The diodes have biases of opposite polarity applied that permit current flow through only one of the two diodes at a time. When the starter-generator changes from motor to generator operation the bias on the diodes is reversed causing current flow in the opposite diode.

PATENTED JUL27 1971   3,596,105

INVENTOR.
JOSEPH D. SEGREST

BY

*Henry Hauser*
ATTORNEY

CONFIGURATION FOR OPTIMUMIZATION OF STARTER-GENERATOR DESIGN

STATEMENT OF GOVERNMENT INTEREST

The invention described herein may be manufactured and used by or for the Government of the United states of America for governmental purposes without the payment of any royalties thereon or therefor.

BACKGROUND OF THE INVENTION

This invention generally relates to DC starter-generators and, more particularly, to a unique field excitation circuit for such starter-generators as normally used in jet aircraft.

The starter-generator begins operation as a motor in order to start an aircraft engine. When the engine comes up to rated speed, it in turn drives the starter-generator, so that the starter-generator then operates as a generator. The optimum configuration for the armature and field windings is not the same on starting as a motor as it is on running as a generator. The long shunt configuration with the shunt field winding connected in parallel to the serially connected armature and series field windings provides best starter breakaway torque when the machine is running as a motor but comprises generator overload capacity. On the other hand the short shunt configuration with the shunt field winding connected in parallel to only the armature winding provides best generator overload capability but compromises starter breakaway torque.

In the past the design engineer would have to select a field excitation that would be a compromise between best motor starting capability and best generator overload capability.

SUMMARY OF THE INVENTION accordingly, it is a general purpose of the present invention to provide a field circuit configuration optimum for starting as a motor, and then automatically switching to another field circuit configuration optimum for running as a generator.

This is accomplished in the starter-generator by the anodes of two diodes being connected to the shunt field winding and having the cathode of one diode connected to one side of the series field winding and the cathode of the other diode connected to the other side of the series field winding. Then, depending upon the bias on each of the diodes, the shunt and series fields winding are connected in either the long shunt or the short shunt configuration.

DESCRIPTION OF THE PREFERRED EMBODIMENT

Figure 1:
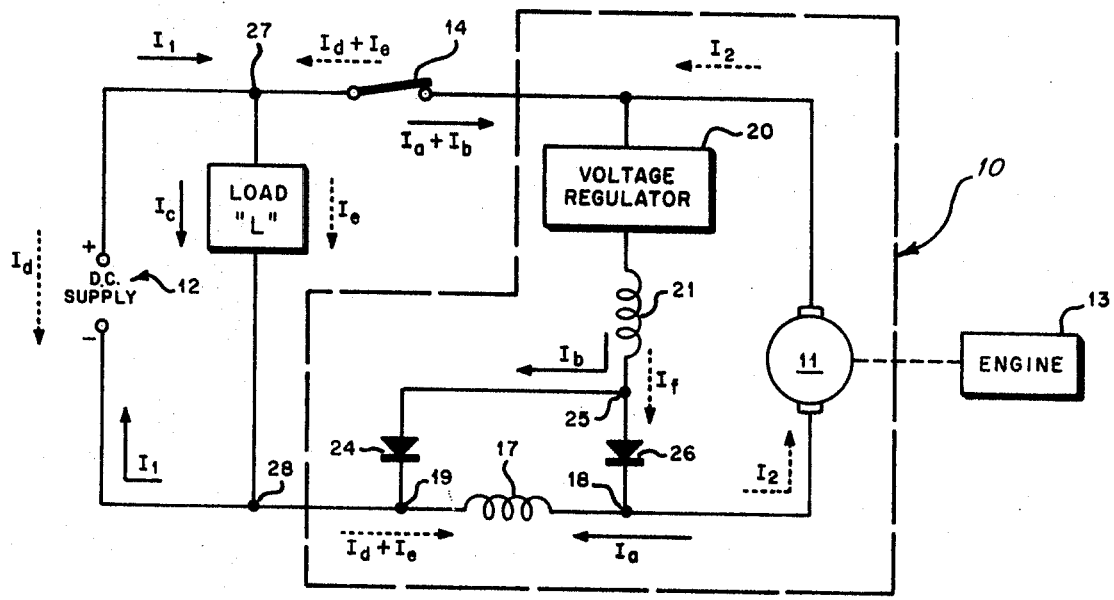
FIG. 1 is a schematic diagram of a starter-generator circuit according to the present invention.

Referring now to the drawing, a starter-generator 10 has an armature winding 11 mechanically coupled to an engine 13. A series field winding 17 is connected in series with the armature 11 at a junction 18, Interpole windings (now shown) if included in a starter-generator would be connected in a conventional manner to the series field winding. A voltage regulator 20 is connected in series with a shunt field winding 21 of the starter-generator 10 and this series connection is in turn connected so that there is a parallel current path with either the armature winding 11 or the armature winding 11 in series with the series fielding winding 17. This current path depends on the biasing of two diodes 24 and 26 that have their anodes connected to an electrical terminal of the shunt field winding 21 opposite to the shunt field winding terminal connected to the voltage regulator 20. The cathode of diode 26 is connected at junction 18 which is located between the armature winding 11 and the series field winding 17. The cathode of diode 24 is connected at a junction 19 to the opposite side of the series field winding 17 than the diode 26.

The input-output terminals of the starter-generator 10 are connected through a starting switch 14 to a DC power supply and a load L. The negative side of the DC supply may be connected to ground although this is not essential for operation.

Switch 14 may be of any conventional type for motor starting; however, an ON-OFF switch 14 is shown for simplicity, as the details of the starting circuit itself are not part of this invention.

The load L receives its power from the DC supply until the starter-generator starts operating as a generator and supplies the power for the load L.

Operation of the starter-generator 10 is initiated by the closure of switch 14. The current delivered by the DC supply is designated $I_1$. This current is divided into the three parallel branches $I_a$, $I_b$, and $I_c$. The current $i_a$ through windings 11 and 17 produces a potential across the series field winding 17 and places junction 18 at a higher potential than junction 19.

The current $I_b$ flows through the series connection of the voltage regulator 20, the shunt field winding 21, and the diode 24. Since the diode 24 is forward biased, a low resistance path connects junction 25 with junction 19. This places junction 25 at a potential nearly equal to that of junction 19. Junction 18 on the other hand has a higher potential than junction 19 due to the potential across the series field winding 17. Therefore junction 18 has a higher potential than junction 25, and this higher potential reverse biases diode 26 causing diode 26 to block all currents.

Figure 2:
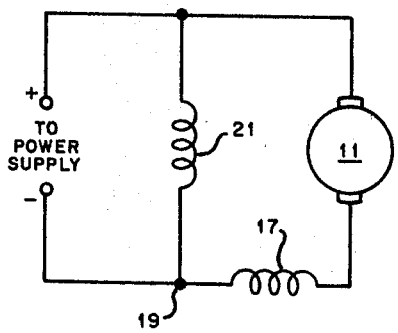
FIG. 2 is a simplified schematic diagram of the starter-generator of FIG. 1 operating as a motor in a "start" mode.

The "start" operation is the long shunt configuration of FIG. 2. Diode 24 appears as a zero-resistance conductor as it is in effect a short circuit, and the path from junction 25 to junction 18 is omitted as diode 26 in effect operates as an open circuit.

It is at this time the starter-generator 10 behaves as a motor. On coming up to rated speed, the engine 13 then drives the armature 11 and the starter-generator 10 commences operation as a generator.

The current supplied by the armature winding 11 in FIG. 1 is designated $I_2$ and provides parallel branch currents $I_d$, $I_e$ and $I_f$. The current $I_d$ recharges the DC supply, and current $I_e$ is fed to the load L. The two currents $I_d$ and $I_e$ recombine at junction 28 into the current $I_d + I_e$ and flow through series field winding 17 causing a potential across the series field winding 17 in an opposite direction to that developed during motor operation. This current reversal gives junction 19 a higher potential than junction 18. Junction 25 being at a voltage similar to that of junction 19 now forward biases diode 26 causing a low impedance path through diode 26 to junction 18. This brings junction 25 to a potential near that of junction 18 and reverse biases diode 24, blocking current through this original current path. The current $I_f$ now flows through voltage regulator 20, shunt field winding 21 and diode 26.

Figure 3:
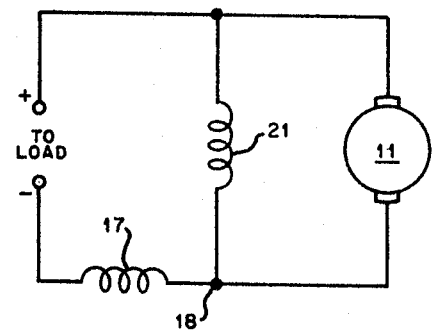
FIG. 3 is a simplified schematic diagram of the starter-generator of FIG. 1 operating as a generator in a "run" mode.

The simplified schematic diagram of this generator operation can be seen in FIG. 3. It will be noted that the windings of starter-generator 10 are now in a short shunt exciter field configuration. This provides for optimum performance during operation as a generator.

It is seen that by the use of two diodes the starter-generator on being energized and operating as a motor is provided with a long shunt exciter field for maximum breakaway torque. Once the starter-generator has started the engine and is in turn driven by the engine, the starter-generator operates as a generator and has the diodes convert the exciter field to a short shunt configuration for best overload characteristics.

Obviously many modifications and variations of the present invention are possible in the light of the above teachings. It is therefore to be understood that within the scope of the appended claims the invention may be practiced otherwise than as specifically described.

What I claim is:

1. A DC machine comprising:

an armature winding adapted to operate as a motor or generator;

a series field winding having one terminal thereof operatively connected to one terminal of said armature winding;

a shunt field winding having one terminal thereof operatively connected to the other terminal of said armature winding;

control means operatively connected to the other terminal of said shunt field winding and both terminals of said series field winding responsive to the direction of current through said series field winding for automatically establishing alternative electrical conductivity between said other terminal of said shunt field winding and wither terminal of said series field winding; and a pair of input-output terminals operatively connected across said other terminals of said series field winding and said armature winding and adapted to be simultaneously connected to a power supply and an electrical load.

2. A DC machine according to claim 1 wherein said control means further comprises:

a first diode operatively connected in series with said shunt field winding across said armature winding only; and a second diode operatively connected in series with said shunt winding across both said armature and said series field windings.

3. A DC machine according to claim 2 wherein said first and second diodes have the anodes thereof connected in common.

4. A DC machine according to claim 3 further comprising:

a voltage regulator operatively connected in series with said shunt field winding across said armature winding.

5. A power system comprising, in combination:

a power supply;

a load connected across said power supply;

an armature winding adapted to operate as a motor or generator and including a rotatable output shaft and one terminal operatively connected to one terminal of said power supply;

an engine drivingly connected to said output shaft;

a series field winding having one terminal thereof operatively connected to the other terminal of said armature winding and the other terminal thereof connected to the other terminal of said power supply;

a shunt field winding having one terminal operatively connected to said one terminal of said armature winding; and control means operatively connected to the other terminal of said shunt field winding and both terminals of said series field winding responsive to the direction of current through said series field winding for automatically establishing electrical conductivity between said other terminal of said shunt field winding and said other terminal of said series field winding when said armature winding is operating as a motor and between said one terminal of said series field winding when said armature winding is operating as a generator.

6. A power system according to claim 5 wherein said control means further comprises:

a first diode operatively connected in series with said shunt field winding across said armature winding only; and second diode operatively connected in series with said shunt winding across both said armature winding and said series field winding.

7. A power system according to claim 6 wherein said first and second diodes have the anodes thereof connected in common.

8. A power system according to claim 7 further comprising:

a voltage regulator operatively connected in series with said shunt field winding across said armature winding.

9. In A DC machine capable of starting as a motor and shifting into a generator mode of operation wherein said DC machine having an armature winding in series with a series field winding and a shunt field winding in parallel across the series-connected armature and series field winding, the improvement comprising:

a first diode connected in series with said shunt field winding, the series combination of said first diode and said shunt field winding being in parallel across said series-connected armature and said series field winding; and a second diode connected in series with said shunt field winding, and series combination of said second diode and said shunt field winding being in parallel with said armature winding, said first and second diodes having the anodes thereof connected in common.

10. In a DC machine capable of starting as a motor and shifting into a generator mode of operation wherein said DC machine having an armature winding in series with a series field winding and a shunt field winding in parallel across the series-connected armature and series field winding, the improvement comprising:

a first diode connected in series with said shunt field winding, the series combination of said first diode and said shunt field winding being in parallel across said series-connected armature and said series field winding; and a second diode connected in series with said shunt field winding, the series combination of said second diode and said shunt field winding being in parallel with said armature winding, said first and second diodes having common polarity electrodes joined together.